(12) United States Patent
Vogh, Jr. et al.

(10) Patent No.: US 10,049,294 B2
(45) Date of Patent: Aug. 14, 2018

(54) IMAGING APPARATUS, SYSTEMS AND METHODS

(71) Applicant: X-Rite Switzerland GmbH, Regensdorf (CH)

(72) Inventors: James William Vogh, Jr., Boxford, MA (US); Olivier Calas, Lowell, MA (US); Beat Frick, Buchs (CH)

(73) Assignee: X-Rite Switzerland GmbH, Regensdorf (CH)

( * ) Notice: Subject to any disclaimer, the term of this patent is extended or adjusted under 35 U.S.C. 154(b) by 0 days.

(21) Appl. No.: 14/610,012

(22) Filed: Jan. 30, 2015

(65) Prior Publication Data

US 2016/0224861 A1    Aug. 4, 2016

(51) Int. Cl.
| | |
|---|---|
| *G06K 9/00* | (2006.01) |
| *G06K 9/46* | (2006.01) |
| *H04N 1/60* | (2006.01) |
| *G06K 9/52* | (2006.01) |
| *G06T 7/90* | (2017.01) |

(52) U.S. Cl.
CPC ......... *G06K 9/4661* (2013.01); *G06K 9/4652* (2013.01); *G06K 9/52* (2013.01); *G06T 7/90* (2017.01); *H04N 1/6038* (2013.01)

(58) Field of Classification Search
None
See application file for complete search history.

(56) References Cited

U.S. PATENT DOCUMENTS

| | | | |
|---|---|---|---|
| 4,647,211 A * | 3/1987 | Browne | G01B 11/285 356/447 |
| 5,177,694 A | 1/1993 | Graham et al. | |
| 6,628,829 B1 | 9/2003 | Chasen | |
| 6,925,205 B2 | 8/2005 | Leedham et al. | |

(Continued)

FOREIGN PATENT DOCUMENTS

| | | |
|---|---|---|
| JP | H06 341818 | 12/1994 |
| WO | WO 2007/042844 A2 | 4/2007 |

OTHER PUBLICATIONS

Yu et al, Inverse Global Illumination: Recovering Reflectance Models of Real Scenes from Photographs, Proceedings of the 26th annual conference on Computer graphics and interactive techniques, pp. 215-224 ACM Press/Addison-Wesley Publishing Co. New York, NY, USA, 1999.*

(Continued)

*Primary Examiner* — Andrae S Allison
(74) *Attorney, Agent, or Firm* — Hahn Loeser & Parks, LLP

(57) ABSTRACT

The present disclosure advantageously provides apparatus, systems and methods which facilitate estimating and accounting for illumination conditions, viewing conditions and reflectance characteristics for imaged surfaces when performing color measurement, correction and/or transformation in an imaging process, such as photography. Advantageously, the disclosed apparatus, systems and methods may utilize a set of one or more illumination target elements for extrapolating illumination conditions from an imaged scene. The disclosure may be used to improve determination of color correction/transformation parameters and/or to facilitate determining a reflectance model for a target surface of interest.

24 Claims, 9 Drawing Sheets

(56) References Cited

U.S. PATENT DOCUMENTS

| | | | |
|---|---|---|---|
| 7,522,767 B2 | 4/2009 | Baker et al. | |
| 8,094,879 B2 | 1/2012 | Kalla et al. | |
| 8,588,522 B2 | 11/2013 | Bhatti et al. | |
| 8,743,137 B2 | 6/2014 | Peters et al. | |
| 8,953,037 B2 | 2/2015 | Wang et al. | |
| 8,998,613 B2 | 4/2015 | Jung et al. | |
| 2004/0100465 A1* | 5/2004 | Stowe | G06T 15/00 345/427 |
| 2010/0238301 A1* | 9/2010 | Kojima | G01J 3/46 348/207.1 |
| 2010/0290697 A1* | 11/2010 | Benitez | G06T 15/50 382/154 |
| 2013/0093883 A1* | 4/2013 | Wang | G01N 21/55 348/142 |
| 2014/0285806 A1 | 9/2014 | Haas | |
| 2016/0224861 A1* | 8/2016 | Vogh, Jr. | G06K 9/4652 |

OTHER PUBLICATIONS

K. Nishino, Z. Zhang and K. Ikeuchi, "Determining Reflectance Parameters and Illumination Distribution from Sparse Set of Images for View-Dependent Image Synthesis," Proc. IEEE Int'l Conf. Computer Vision 01, pp. 599-606, Jul. 2001.*

K. Hara, K. Nishino and K. Ikeuchi, "Light source position and reflectance estimation from a single view without the distant illumination assumption," in IEEE Transactions on Pattern Analysis and Machine Intelligence, vol. 27, No. 4, pp. 493-505, Apr. 2005.*

M. Chandraker, J. Bai and R. Ramamoorthi, "A theory of differential photometric stereo for unknown isotropic BRDFs," Computer Vision and Pattern Recognition (CVPR), 2011 IEEE Conference on, Providence, RI, 2011, pp. 2505-2512.*

A. Hertzmann and S. M. Seitz, "Example-based photometric stereo: shape reconstruction with general, varying BRDFs," in IEEE Transactions on Pattern Analysis and Machine Intelligence, vol. 27, No. 8, pp. 1254-1264, Aug. 2005.*

Tao, Michael W., et al. "Depth estimation for glossy surfaces with light-field cameras." European Conference on Computer Vision. Springer International Publishing, 2014.*

Cobra, Estimation and Correction of Geometric Distortions in Side-Scan Sonar Images, May 1990, http://www.rle.mit.edu/dspg/documents/DCobra0390.pdf.*

Palma, Gianpaolo, et al. "A statistical method for SVBRDF approximation from video sequences in general lighting conditions." Computer Graphics Forum. vol. 31. No. 4. Blackwell Publishing Ltd, 2012.*

Lalonde J.-F., Efros A. A.: Synthesizing Environment Maps from a Single Image. Tech. Rep. CMU-RI-TR-10-24, Robotics Institute, Carnegie Mellon University, Jul. 2010. 4, 6.*

Xing, Guanyu, et al. "Lighting simulation of augmented outdoor scene based on a legacy photograph." Computer Graphics Forum. vol. 32. No. 7. 2013.*

Jul. 4, 2016 Extended European Search Report for EP 16 15 2896.3.

Xiaowu Chen et al., "Single image based illumination estimation for lighting virtual object in real scene".

* cited by examiner

IMAGING APPARATUS, SYSTEMS AND METHODS

BACKGROUND

1. Technical Field

The present disclosure relates to color measurement and color correction/color transformation in an imaging process, such as photography.

2. Background Art

Accurately estimating the color appearance in a scene that has been photographed has always been a challenge. Two conventional approaches exist to estimate color.

The first conventional approach to estimate color is to understand the process of capturing the color well enough so that the colors in the scene can be estimated based on the captured colors and knowledge of illumination source. For a digital camera, this method may require knowledge of the camera's spectral sensitivity as well as any non-linearity that existed. For example, photographers can use standardized transformations to correct/transform colors for different types of lighting, such as incandescent light, florescent light, sunlight, etc., e.g., by applying white balance. Unfortunately, the accuracy of such transformations is limited and often does not account for illumination angles and the "Bidirectional Reflectance Distribution Function" (BRDF) of the measured surface.

The second conventional approach to estimate color is to place known colors in a photographed scene and then create a transform from the captured colors to the known colors. For example, a target with a set of known colors can be photographed with a scene and used to calculate the transform based on a deviation between the actual and photographed appearance of the colors in the target. This transformation can then be used to calibrate colors in future photographs of the same scene (i.e., under the same lighting characteristics).

For this second approach, a number of factors can contribute to the accuracy of the transform. One important factor is the illumination of the target. The illumination of the target may be non-uniform (for example, the illumination may be from one or more sources that are in different directions relative to the target). Notably, the perceived appearance of the colors on the target and the colors in the scene is a function of both the lighting angles relative to the surface and the viewing angles relative to the surface. A BRDF can be used to describe how light is reflected from opaque surfaces. In particular, the BRDF of a surface can model how an appearance of a surface (e.g., perceived color of a surface) changes based on illumination and viewing conditions. Thus, if the colors in the target are characterized by a different BRDF than the colors in the scene or if the target is at a different viewing angle, the accuracy of a conventionally computed transformation may be insufficient.

U.S. Publication No. 2013/0093883 to Wang, et al., ("Wang") discloses a "BRDF reference chart" which includes a set of materials with different reflection properties (color, material, texture, finish, etc.). Reference reflectance response distribution functions are matched to calculated reflectance responses, and an image of the target is reconstructed based at least in part on the matched reference reflectance response distribution functions. The reference chart in Wang, however, fails to enable or facilitate determination of illumination conditions for an imaged scene (evidenced by the fact that the reference chart in Wang is imaged at a plurality of viewing angles).

Thus, there exist needs for new and improved apparatus, systems and methods which increase the accuracy of color estimation and transformation in an imaging process, such as photographic processes. These and other needs are addressed by the present disclosure.

SUMMARY

Systems and methods are presented herein that advantageously increase the accuracy of color estimation and transformation in an imaging process such as photography. In exemplary embodiments, the systems and methods may utilize a target apparatus which may include a set of one or more illumination target elements adapted for enabling determination of one or more illumination conditions for an imaged scene based on the inclusion of the target apparatus in the imaged scene. In some embodiments, the one or more illumination conditions for the imaged scene may include, for a light source illuminating the imaged scene, (i) spatial characteristics of the light source relative to the target apparatus, (ii) intensity characteristics of the light source, and (iii) color characteristics of the light source.

In exemplary embodiments, the set of one or more illumination target elements may be characterized by a known plurality of different surface normals that include at least one of (i) across the set, and/or (ii) across a single illumination target element. For example, the set of one or more illumination target elements may include at least one illumination target element characterized by a non-planer surface such as may be characterized by a known surface normal map including a plurality of different surface normals. In some embodiments, the at least one illumination target element having a non-planar surface may be a sphere or a partial sphere.

In exemplary embodiments, the set of one or more illumination target elements may include a plurality of illumination target elements, each characterized by a different surface normal or different surface normal map, for example, wherein each of the plurality of illumination target elements includes a planar surface characterized by a different surface normal.

In some embodiments, the one or more illumination target elements may be glossy or semi-glossy so as to enable imaging discernible reflections of the light sources from one or more surfaces thereof. In exemplary embodiments, the one or more illumination target elements are colored black in order to improve signal-to-noise ratio. In further exemplary embodiments, the one or more illumination target elements may be characterized by a gloss level that mitigates overexposure.

In some embodiments, the one or more illumination target elements may be characterized by predetermined reflectance characteristics that are similar to reflectance characteristics for sample surface(s) of interest. For example, the one or more illumination target elements may be characterized by a predetermined gloss level which is similar to the gloss level for a sample surface of interest.

In exemplary embodiments, the target apparatus may also include a set of a plurality of color target elements. In some embodiments, the target apparatus may be included in a system that further includes an imaging device and a processor, the processor being configured to determine color transformation parameters based on differences between expected colors and captured colors for the set of color target elements, wherein the imaging device is configured to detect the captured colors for the set of color target elements, and wherein the processor is configured to determine the expected colors for the set of color target elements based on known colors of the set of color target elements and accounting for illumination conditions, viewing conditions and reflectance characteristics for the set of color target elements during imaging of the target apparatus by the imaging device.

In exemplary embodiments, the target apparatus may further include alignment features for enabling determination of spatial characteristics of the target apparatus in an image thereof. In some embodiments, the target apparatus may include a sample window for aligning a sample surface with the target apparatus. In yet further exemplary embodiments, the target apparatus may include a distortion target element.

In some embodiments, the target apparatus may be included as part of a system that further includes an imaging device and a processor, the processor being configured to determine one or more illumination conditions for an image including the target apparatus based on a processing of the image by the processor.

In exemplary embodiments, the target apparatus may be included as part of a system that further includes an imaging device and a processor, the processor being configured to (i) determine, for each image in a plurality of images of a scene including the target apparatus and a sample surface acquired by the imaging device across a plurality of different illumination or viewing conditions, illumination conditions and viewing conditions based on a processing of the image, and (ii) estimate a reflectance model for the sample surface based on changes in reflectance of the sample surface as reflected in acquired images of the scene across the plurality of different illumination and/or viewing conditions.

In exemplary embodiments, a method for determining color transformation parameters may include steps of: placing a target apparatus including a set of color target elements having known colors in a scene to be imaged; imaging the target apparatus to determine captured colors for the set of color target elements; determining expected colors for the set of color target elements based on the known colors of the set of color target elements and accounting for illumination conditions, viewing conditions and reflectance characteristics for the set of color target elements as reflected during the imaging of the target apparatus; and calculating color transformation parameters based on differences between the expected colors and the captured colors for the set of color target elements.

Additional features, functions and benefits of the disclosed apparatus, systems and methods will be apparent from the description which follows, particularly when read in conjunction with the appended figures.

BRIEF DESCRIPTION OF THE DRAWINGS

To assist those of ordinary skill in the art in making and using the disclosed apparatus, systems and methods, reference is made to the appended figures, wherein.

DESCRIPTION OF EXEMPLARY
EMBODIMENT(S)

Figure 1:
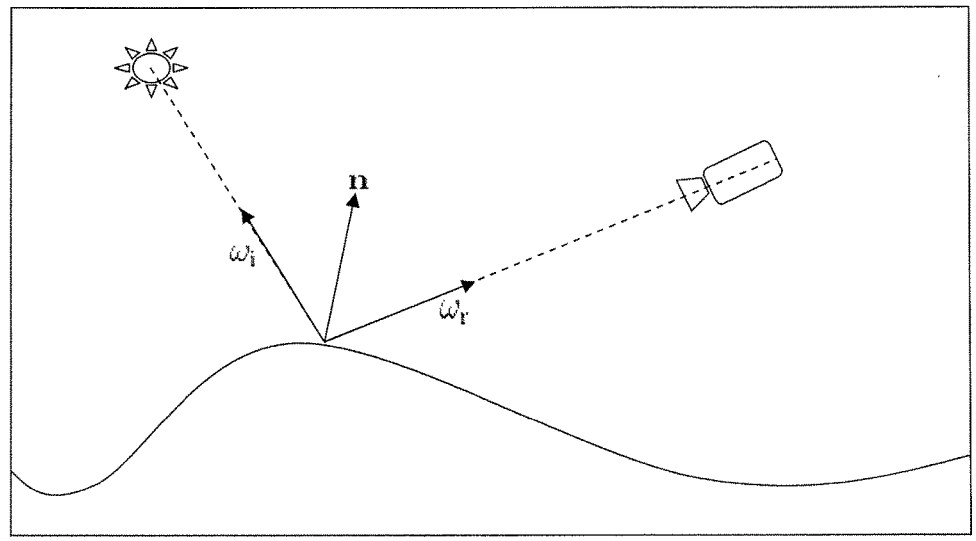
FIG. 1 illustrates exemplary illumination, viewing, and surface normal vectors that may be used as parameters in modeling reflectance characteristics of an imaged surface according to the present disclosure.

The present disclosure advantageously provides apparatus, systems and methods that facilitate estimating and accounting for (i) illumination conditions, (ii) viewing conditions, and (iii) reflectance characteristics for imaged surfaces when performing color measurement/correction/transformation in an imaging process such as photography. Relevant illumination conditions may include, for example, for each light source, spatial characteristics of the light source (such as an illumination vector relative to a surface normal of an imaged surface), intensity characteristics of the light source and color characteristics of the light source. Relevant viewing conditions may include, for example, for an image sensor, spatial characteristics of the image sensor (such as the viewing vector relative to a surface normal of an imaged surface). Relevant reflectance characteristics for an imaged surface may generally define how the reflectance of a surface (including, e.g., a perceived color of a surface) changes based on illumination and viewing conditions. For example, the reflectance characteristics may include a BRDF for a surface which may define reflectance $f_r$ (a ratio of radiance to irradiance) as a function of an illumination (irradiance) vector ($\omega_i$) and viewing (reflectance) vector ($\omega_r$) (alone or in combination with other parameters). Both the illumination vector and viewing vector may be defined with respect to a surface normal n of the imaged surface (see, e.g., FIG. 1 illustrating exemplary illumination ($\omega_i$) viewing ($\omega_r$) and surface normal n vectors which may be used as parameters in modeling surface reflectance characteristics).

In particular, each direction w may be further parameterized by an azimuth angle $\phi$ and zenith angle $\theta$ relative to the surface normal vector n. It is noted that in some embodiments, surface reflectance characteristics may be wavelength dependent, for example, due to effects such as iridescence and luminescence. Thus, the BRDF may further account for such wavelength dependence as a function of a wavelength of incident light $\lambda_i$ and a wavelength of reflected light $\lambda r$. In some embodiments, the BRDF may be a Spatially Varying Bidirectional Reflectance Distribution Function (SVBRDF) that includes an additional parameter of a 2D location over an object's surface (X). In other embodiments, the BRDF may be a Bidirectional Texture Function (BTF) which may account for non-local scattering effects like shadowing, masking, inter-reflections or subsurface scattering. In yet further embodiments, the BRDF may be a Bidirectional Surface Scattering Reflectance Distribution Function (BSSRDF) which may account for the fact that light entering at a first location $X_i$ of a surface may scatter internally and exit at another location $X_r$.

As noted above, one aspect of the apparatus, systems and methods of the present disclosure is to enable/facilitate estimation of illumination conditions for an imaged scene. Thus, in exemplary embodiments, a target apparatus may be provided that includes one or more illumination target elements adapted for enabling/facilitating determination of one or more illumination conditions for an imaged scene based on the inclusion of the target apparatus in the imaged scene.

In exemplary embodiments, the target apparatus may include a plurality of illumination target elements each having different reflectance properties (e.g., different BRDF properties). For example, the target apparatus may include a plurality of illumination target elements each characterized by a different amount of gloss. The potential changes in viewing and illumination vectors across the target apparatus may make this method difficult to implement.

In further embodiments, the target apparatus may include a set of one or more illumination target elements characterized by a known plurality of different surface normals (e.g., across the set and/or across a single illumination target element). In exemplary embodiments, the set of one or more illumination target elements may include at least one illumination target element having a non-planar surface, for example, wherein the non-planar surface is characterized by a known surface normal map including a plurality of different surface normals. For example, the at least one illumination target element having a non-planar surface may be a sphere/partial sphere (advantageously the surface normal map for an imaged sphere is the same regardless of orientation thereof). In further embodiments, the set of one or more illumination target elements may include a plurality of illumination target elements each characterized by a different surface normal or different surface normal map. For example, each of the plurality of illumination target elements may include a planar surface characterized by a different surface normal.

Figure 2:
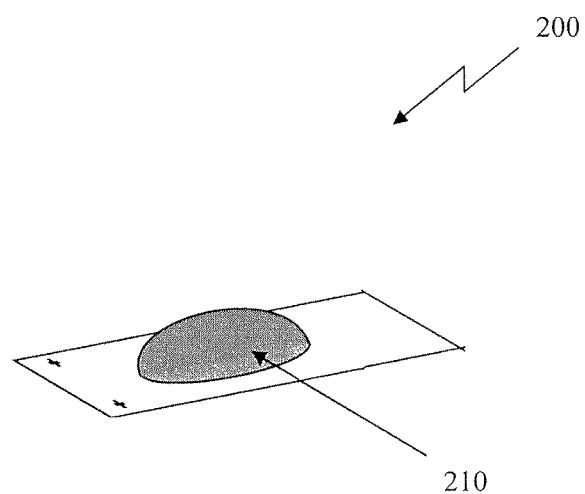
FIGS. 2-4 depict exemplary embodiments of target apparatus including a set of one or more illumination target elements, according to the present disclosure.
Figure 3:
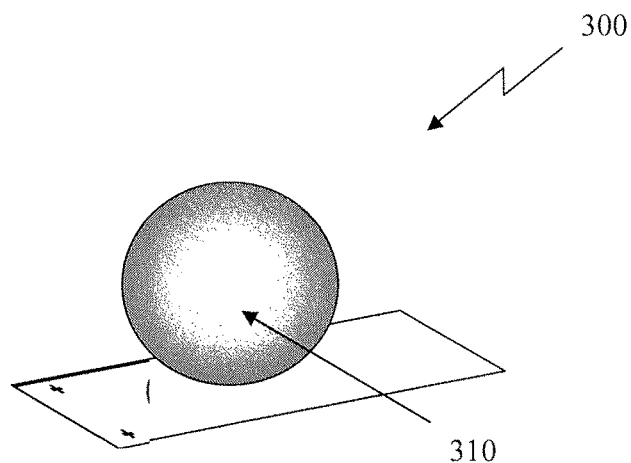
Figure 4:
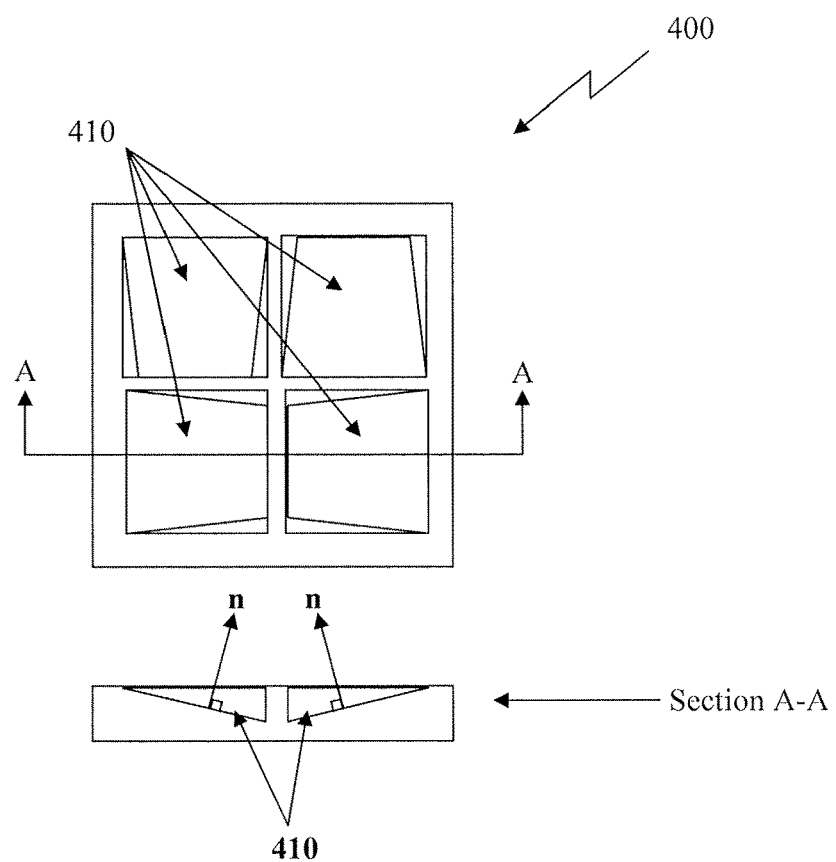

With reference to FIGS. 2-4, exemplary target apparatus 200, 300 and 400 are depicted. Each of the exemplary target apparatus 200, 300, 400 includes a set of one or more illumination target elements 210, 310, 410 characterized by a known plurality of different surface normals (e.g., across the set and/or across a single illumination target element). For example, in some embodiments such as schematically depicted in FIGS. 2 and 3, the exemplary target apparatus 200 or 300 may include an illumination target element 210 or 310 having a non-planar surface (depicted as a partial sphere in FIG. 2 and a full sphere in FIG. 3). In other embodiments such as schematically depicted in FIG. 4, the exemplary target apparatus 400 may include a plurality of illumination target elements 410 each characterized by a different surface normal n.

Figure 5A:
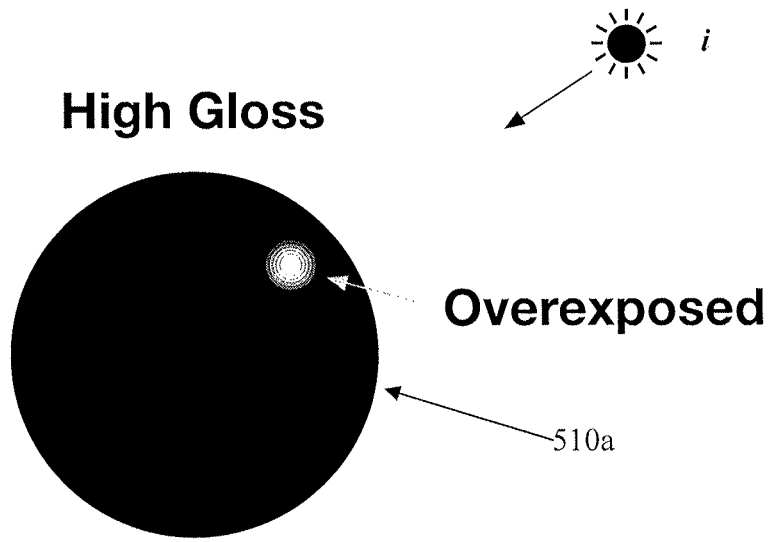
FIGS. 5A and 5B compare overexposure caused by reflectance of light source off a high gloss surface of an illumination target element with proper exposure resulting from reflectance of light source off a medium gloss surface of an illumination target element, according to the present disclosure.
Figure 5B:
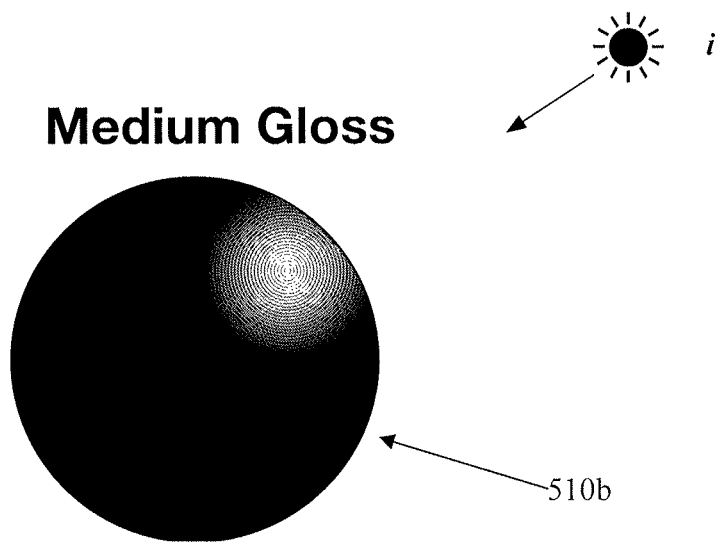

In general, the one or more illumination target elements may be glossy/semi-glossy so as to enable imaging discernible reflections of the light sources from surface(s) thereof. Furthermore, the one or more illumination target elements may be colored black in order to improve the signal to noise ratio. Notably, the one or more illumination target elements are not required to have a mirror-like surface. In fact, in some embodiments a mirror-like finish may result in overexposure (depending on the dynamic range of the imaging equipment). Thus, a mirror-like surface may require multiple exposures to accurately capture the intensities of the light sources, whereas a less glossy surface would mitigate overexposure by reducing intensity and by spatially distributing the reflection across the surface at a wider range of surface normals (compare, e.g., overexposure caused by reflectance of light source i off a high gloss surface of an illumination target element 510a of FIG. 5A with proper exposure resulting from reflectance of light source i off a medium gloss surface of an illumination target element 510b of FIG. 5B). The potential tradeoff of a less glossy surface would be lower accuracy in modeling the light reflected from a surface. As long as the surface being imaged and color corrected/transformed in the scene is not highly glossy, the loss in accuracy should not be very high according to the present disclosure. It is noted that a lower gloss surface may also have computational advantages.

Advantageously, by mapping surface normals of an illumination target element to imaged reflections of light sources, one can determine intensity, color, etc. of the light sources as a function of the illumination vector according to the present disclosure. This can be reflected in a partial environment map of global illumination for a scene derived from imaging a target surface in conjunction with the target apparatus (including the set of one or more illumination target elements). An environment map is a representation of the global illumination for the scene that is in the form of an image (e.g., a 2D image or 3D image) of relevant light sources. Advantageously, the environment map stores information spatially relating the illumination sources in the environment map image to a surface being imaged/measured/color corrected/transformed (e.g., the environmental map includes illumination vector information for each point depicted on the map). Thus, the environment map can provide a full set of illumination conditions (including intensity, color and illumination vector information) for each light source included in the map. While it is noted that the light sources reflected from the surface(s) of the one or more illumination target elements won't necessarily be all of the light sources in the scene, they would have a high probability of being the light sources that were most significantly contributing to the imaged perception of the scene.

Figure 6:
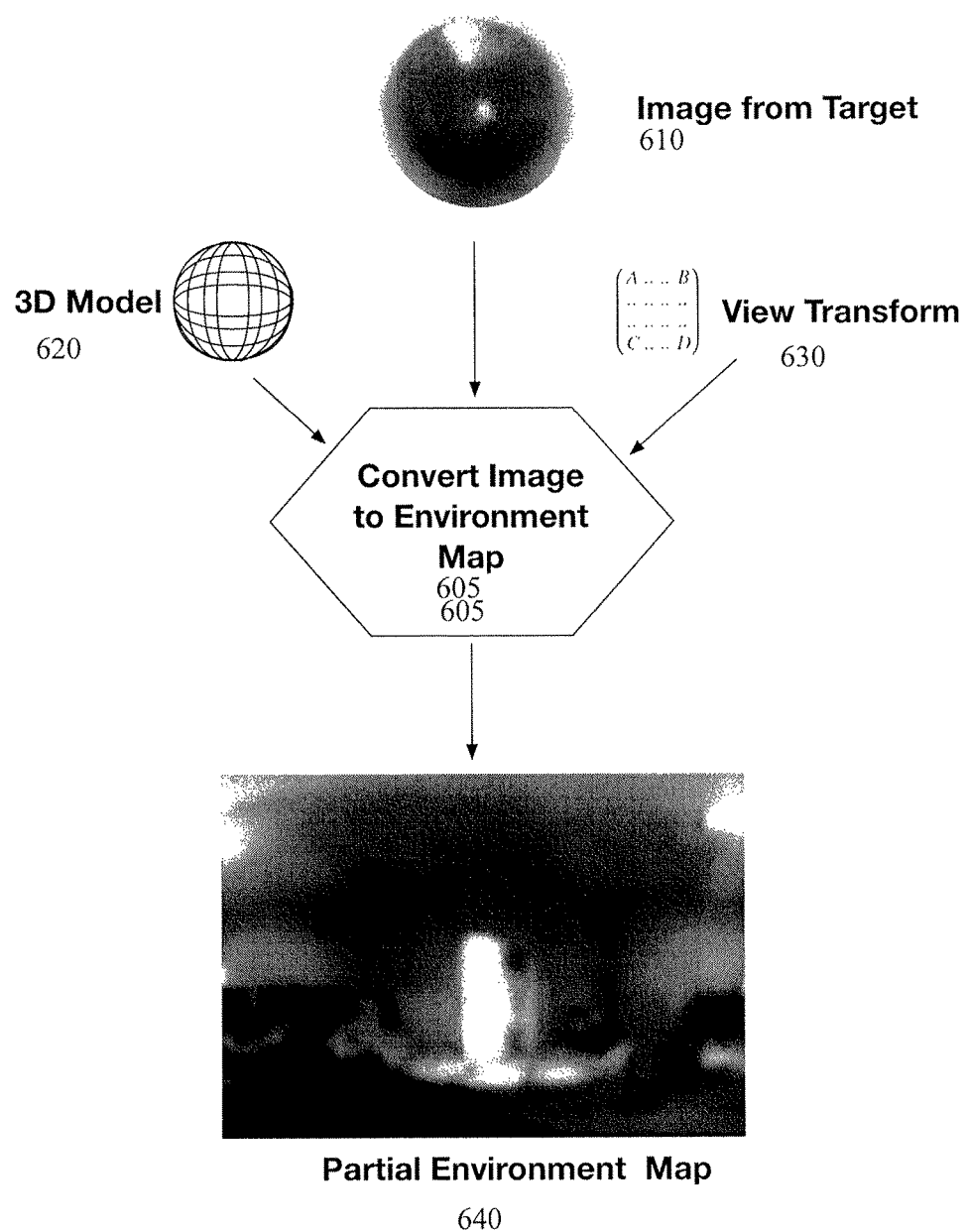
FIG. 6 depicts extracting a partial environment map for an imaged scene by processing an image of a set of one or more illumination target elements, including in the imaged scene, according to the present disclosure.

With reference to FIG. 6, in exemplary embodiments of the present disclosure a partial environment map 640 of the scene can be extracted by processing an image of the set of one or more illumination target elements 610 as including in the imaged scene. In particular, as depicted in FIG. 6, a 3D model 620 (such as a surface normal map) of the imaged set of one or more illumination target elements 610 may be used to transform 605 (e.g., via a processor) the image of the set of one or more illumination target elements 610 into an environment map 640. In exemplary embodiments, the transform 605 may further account for an orientation (view transform 630) of the set of one or more illumination target elements 610, e.g., as determined using alignment marking on the target apparatus or by using image recognition.

Using the known geometry of the imaged target set of one or more illumination target elements, a partial environment map can be created according to the present disclosure by transforming the image of the set of one or more illumination target elements. This transform can be computed very quickly by using a GPU. One potential implementation of this transform would use the image or a crop of the image as a texture. A set of transform parameters derived from the marker locations on the target apparatus would be passed in as uniforms. A 3D object would be used to create the final environment map with texture coordinates that map to a desired form of environment map.

As noted above, the present disclosure advantageously provides apparatus, systems and methods which facilitate estimating and accounting for (i) illumination conditions, (ii) viewing conditions, and (iii) reflectance characteristics for imaged surfaces when performing color measurement/correction/transformation in an imaging process such as photography. An exemplary method 700 for determining color correction/transformation parameters is provided according to FIG. 7 of the present disclosure. In particular, the method 700 may include: (at step 710) placing a target apparatus including a set of color target elements having known colors in a scene to be imaged; (at step 720) imaging the target apparatus to determine perceived (captured) colors for the set of color target elements; (at step 730) determining expected colors for the set of color target elements based on the known colors of the set of color target elements and accounting for illumination conditions, viewing conditions and reflectance characteristics for the set of color target elements during imaging of the target apparatus; and (at step 740) calculating color correction/transformation parameters based on differences between the expected colors and the captured colors for the set of color target elements. Notably, the calculated color correction/transformation parameters could subsequently be used to correct/transform colors of an imaged sample surface of interest (e.g., imaged under the same illumination and viewing conditions in the scene).

Figure 7:
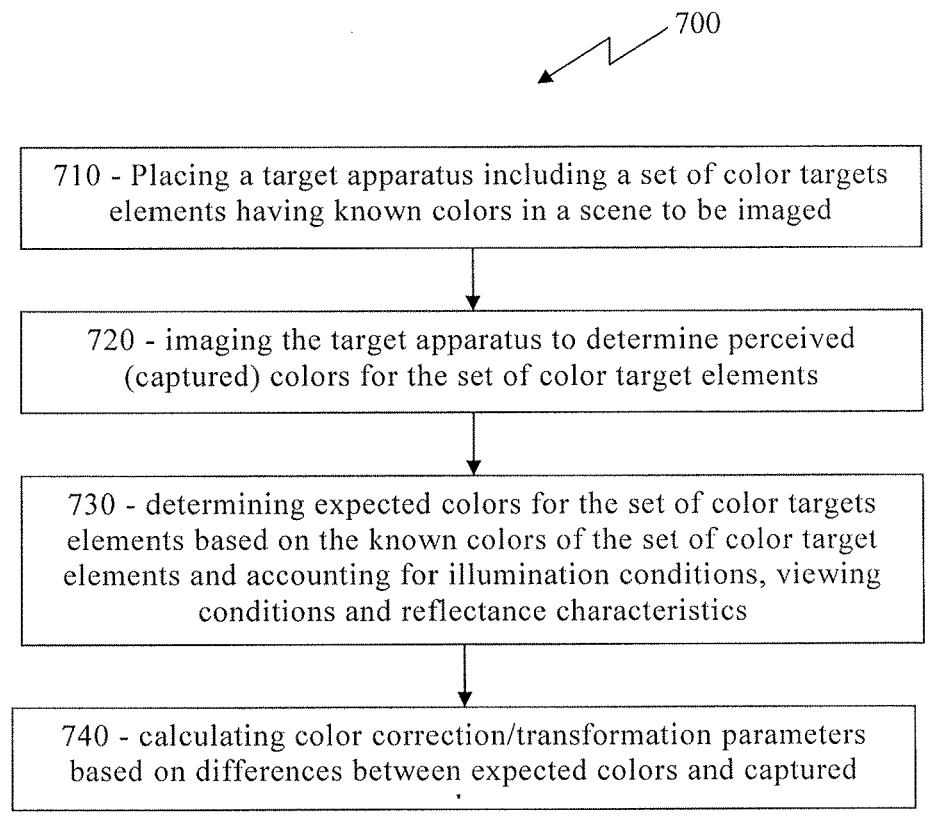
FIG. 7 depicts an exemplary method for determining color correction/transformation parameters according to the present disclosure.

With further reference to the method 700 of FIG. 7, in exemplary embodiments of the present disclosure the reflectance characteristics for the set of color target elements may be known prior to imaging the target apparatus (at step 720). In some embodiments, each of the color target elements in the set of color target elements may exhibit the same reflectance characteristics. In some embodiments, the set of color target elements may be selected so as to exhibit roughly the same reflectance characteristics expected in a sample surface of interest to be imaged. As noted above, the reflectance characteristics for a color target element may be characterized by a modeled BRDF.

In step 730, the modeled BRDF for a color target element may be utilized to calculate reflectance including expected color information for the color target element based on input parameters of the illumination conditions and viewing conditions for the set of color target elements during imaging of the target apparatus. Advantageously, the subject application provides apparatus, systems and methods that enable estimating the illumination and viewing conditions based on imaging of the target apparatus (at step 720). More particularly, in some embodiments, the same or a different target apparatus may include (in addition to the set of color target elements) a set of one or more illumination target elements, such as described above. As noted above, a partial environment map representing global illumination may be derived from the imaging of the set of one or more illumination target elements.

Figure 8:
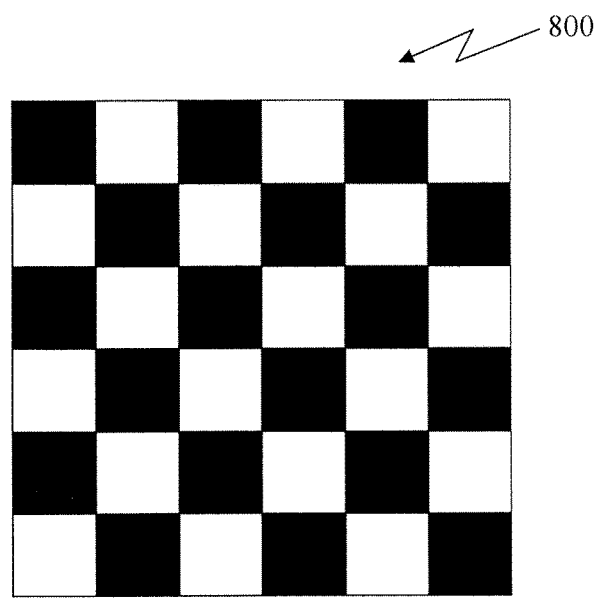
FIG. 8 depicts an exemplary distortion target element according to the present disclosure.

In order to make use of the BRDF data for the color target, the location and orientation in the scene of the set of color target elements and the set of one or more illumination target elements needs to be determined/estimated. In exemplary embodiments, these locations can be determined by creating a transform from image space to scene space. This transform is the inverse of the transform from 3D space to screen space that is used for 3D computer graphics. The transform may take into account optical distortion that is introduced by the optics of the camera. In exemplary embodiments, the creation of the transform may utilize screen coordinates of locations on the (one or more) target apparatus, geometry of the (one or more) target apparatus, knowledge of focal length and field of view, and a description of image distortion caused by the camera optics. Screen locations on the (one or more) target apparatus can be found by using image recognition to either detect marks or some other set of alignment features on the (one or more) target apparatus. The geometry of the (one or more) target apparatus is typically known. The optical distortion can be measured by using a distortion target element that is designed to measure optical distortion (see, e.g., the exemplary distortion target element 800 of FIG. 8). The distortion target element may be included in the same or a different target apparatus than the set of color target elements and/or than the set of one or more illumination target elements.

Figure 9A:
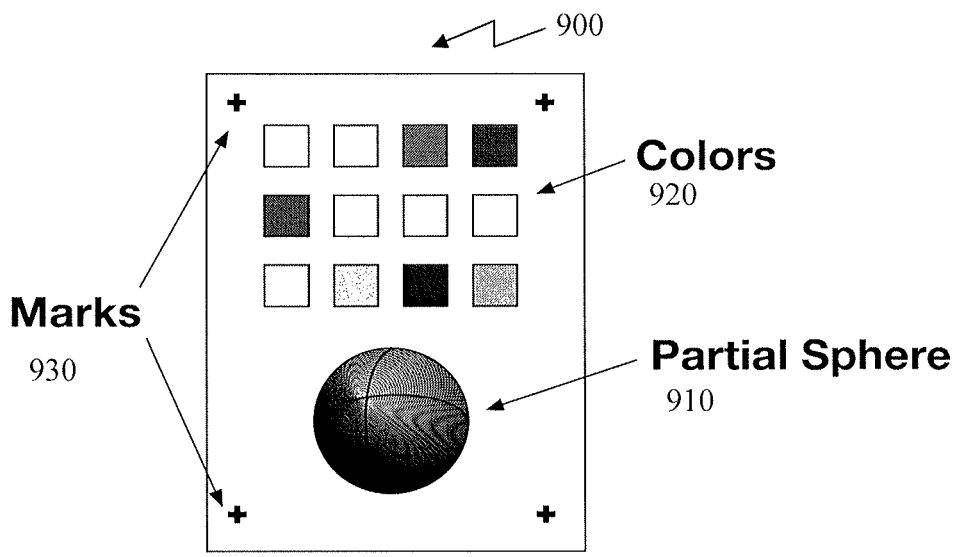
FIGS. 9A and 9B depict top planar and perspective views of an exemplary target apparatus which may be suitable, e.g., for implementing the exemplary method of FIG. 7, according to the present disclosure.
Figure 9B:
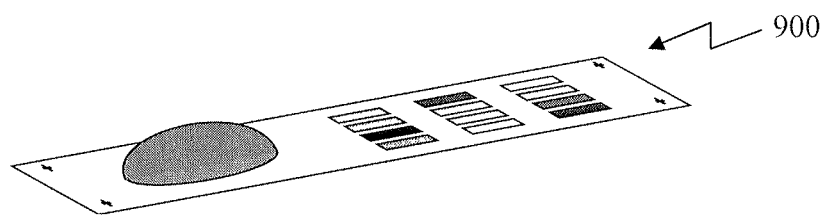
Figure 10:
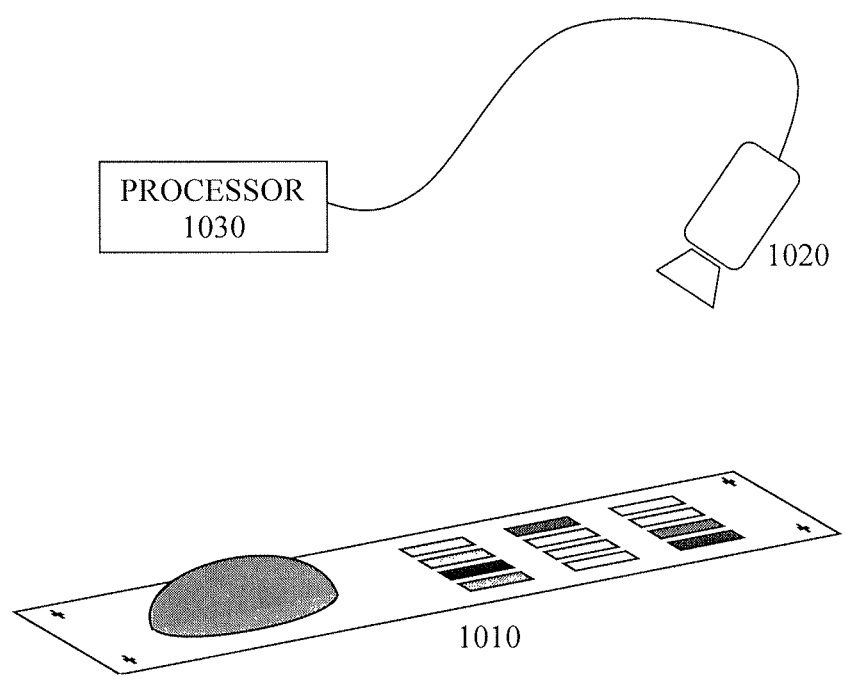
FIG. 10 depicts an exemplary system which may be suitable, e.g., for implementing the exemplary method of FIG. 7, according to the present disclosure.

With reference to FIGS. 9A and 9B, top planar (FIG. 9A) and perspective (FIG. 9B) views are depicted of an exemplary target apparatus 900 which may be suitable, e.g., for implementing the method 700 (for determining color correction/transformation parameters) of FIG. 7. Advantageously, the illustrated target apparatus 900 includes a set of one or more illumination target elements 910 (depicted as a partial sphere), a set of color target elements 920, and target apparatus alignment features 930. Moreover, with reference to FIG. 10, an exemplary system 1000 is depicted which may be suitable, e.g., for implementing the method 700. The illustrated system 1000 includes (one or more) target apparatus 1010, an imaging device 1020 for imaging the (one or more) target apparatus in a scene, and a processor 1130 for processing the image information, e.g., according to the method 700 of FIG. 7, to determine color correction/transformation parameters.

In exemplary embodiments, the ability to determine illumination and viewing conditions for a scene (e.g., using a target apparatus including a set of one or more illumination target elements) may be used in the estimation/determination of a reflectance model (such as a BRDF) for a sample surface of interest.

Figure 11:
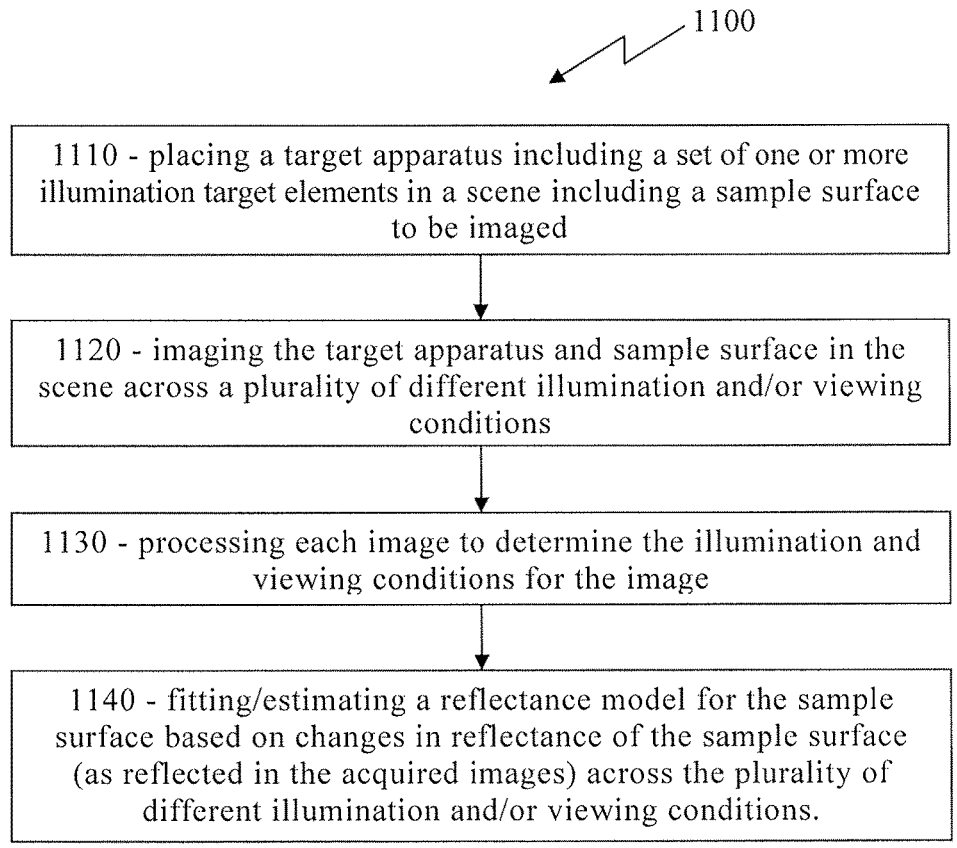
FIG. 11 depicts an exemplary method for determining a reflectance model for a target surface of interest according to the present disclosure.

With reference now to FIG. 11, an exemplary method 1100 is provided for determining a reflectance model for a target surface of interest. In particular, the method 1100 may include: (at step 1110) placing a target apparatus including a set of one or more illumination target elements (such as described herein) in a scene, including a sample surface to be imaged; (at step 1120) imaging the target apparatus and sample surface in the scene across a plurality of different illumination and/or viewing conditions; (at step 1130) processing each image to determine the illumination and viewing conditions for the image; and (at step 1140) fitting/estimating a reflectance model for the sample surface based on changes in reflectance of the sample surface (as reflected in the acquired images) across the plurality of different illumination and/or viewing conditions.

The location and orientation in the scene of the set of one or more illumination target elements and the sample surface of interest may be estimated in order to determine the illumination conditions and viewing conditions from the image. As described above, such locations can be determined by creating a transform from image space to scene space. This transform is the inverse of the transform from 3D space to screen space that is used for 3D computer graphics. The transform may take into account optical distortion that is introduced by the optics of the camera (e.g., using a distortion target element that is designed to measure optical distortion such as the exemplary distortion target element 800 of FIG. 8). The creation of the transform may require screen coordinates of locations on the target apparatus, geometry of the target apparatus, knowledge of focal length and field of view, and a knowledge of image distortion caused by the camera optics. Screen locations on the target apparatus can be found by using image recognition to either detect marks or some other set of alignment features on the target apparatus. The geometry of the target apparatus is typically known.

Figure 12:
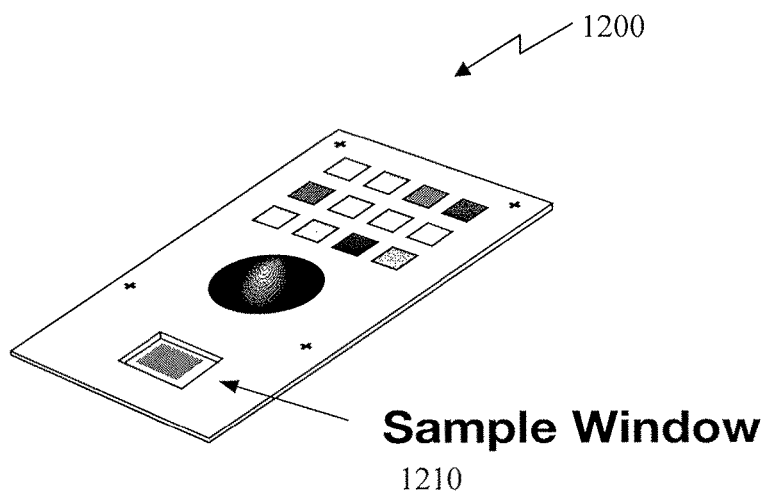
FIG. 12 depicts a target apparatus including a sample window according to the present disclosure.

In some embodiments, the determination of the location and orientation of a surface to be measured can be simplified if the surface is located next to or within the target. In exemplary embodiments such as depicted in FIG. 12, a target apparatus 1200 may include a sample window 1210, e.g., for aligning the sample surface with the target apparatus. In this way, a location and orientation of the sample surface can be determined in much the same way as elements in the target apparatus (e.g., using alignment features of the target apparatus).

In exemplary embodiments, as disclosed herein, the method 1100 of FIG. 11 may be used either independently or in conjunction with a color correction/transformation method, such as described in method 700 of FIG. 7. In exemplary embodiments, fitting a reflectance model (e.g., a BRDF model) to a sample surface of interest may follow a color correction/transformation process.

Figure 13:
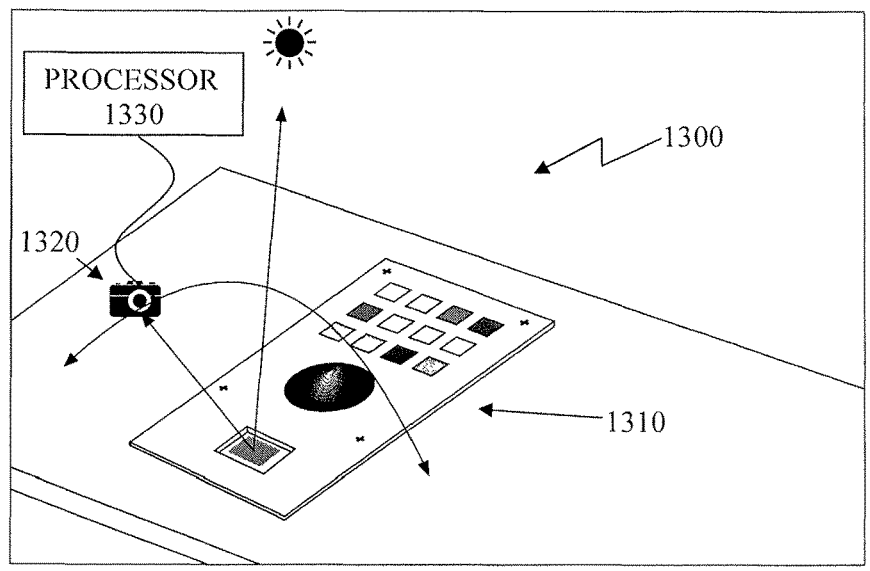
FIG. 13 depicts an exemplary system which may be suitable, e.g., for implementing the exemplary method of FIG. 11, according to the present disclosure.

An exemplary system 1300 for implementing the method 1100 of FIG. 11 is depicted in FIG. 13. The illustrated system 1300 includes a target apparatus 1310 including a set of one or more illumination target elements, an imaging device 1320 for imaging the target apparatus and sample surface of interest in scene across a plurality of different illumination and/or viewing conditions, and a processor 1330 for processing the image information, e.g., according to the method 1100 of FIG. 11 to determine a reflectance model for the sample surface of interest based on illumination and viewing conditions extrapolated for each image. Notably, the system 1300 may be configured to guide a user in moving the imaging device 1320, e.g., during the image capture process of the method 1100 of FIG. 11, so as to ensure that a sufficient diversity of viewing/illumination conditions are captured.

In some embodiments, a reflectance model for the sample surface of interest may be available/known. For example, if the sample surface is human skin, a BRDF model of human skin could be used. One simple approach to measure the parameters of the model may be to compute the standard deviation of the colors in an image of the sample surface and fit the parameters to match both the estimated viewed colors and the image statistics. In exemplary embodiments, estimated viewed colors may be estimated colors of the surface being measured that use an assumed BRDF. Once the model parameters are known, color for the surface of interest can be estimated for any arbitrary lighting and viewing positions.

An alternative approach that would require a less specific BRDF model could utilize multiple images of a scene including a target apparatus and the sample surface of interest across different illumination and/or viewing conditions. See, e.g., method 1100 of FIG. 11. Since the target apparatus provides a means to calculate the mapping to world coordinates, all of the calculations can be done in world coordinates (for the scene). If the sample surface of interest were flat and adjacent to or within the target, its geometry and position in world coordinates would be known. Thus, the multiple images across different illumination and/or viewing conditions (each associated, e.g., with a partial environment map extracted from image data of the target apparatus), the known/determined location and geometry of the sample surface of interest, and mappings to world coordinates may provide the information used to calculate the illumination conditions and viewing conditions for the sample surface of interest in each image. This data can be used to fit parameters to a BRDF model that is appropriate for the sample surface of interest, for example, based on previously available knowledge about the type surface being measured (such as generalized BRDF information modeling human skin). Issues such as shadowing of the light sources by the camera may also be handled during the parameter fitting.

Fitting model parameters to a sample surface of interest that is not flat may be possible, e.g., if the geometry of the sample surface can be measured along with the image of the sample surface (and the target apparatus). 3D sensing technology (e.g., similar to Google's Project Tango) may be used to capture the geometry of a sample surface of interest. If the geometry and position of the sample surface are known to sufficient accuracy, the illumination conditions and viewing conditions for points on the sample surface can be calculated. When combined with an environment map and, in some embodiments, corrected/transformed color values from the images, extrapolated illumination conditions and viewing conditions for each image can be used to estimate parameters for a reflectance model, e.g., for a BRDF model.

In some embodiments, 3D sensing technology could provide the means for capture of the environment as a three dimensional scene. A 3D scene can be captured, e.g., by panning an imaging device across a scene. This 3D scene may replace the environment map and make the use of the set of one or more illumination target elements in the target apparatus unnecessary. The benefit of this 3D scene would be more accurate illumination and viewing condition calculation, e.g., relative to a target apparatus, including a set of a plurality of color targets (such as in the case of determining color correction/transformation parameters) and/or relative to a sample surface of interest (such as in the case of determining a reflectance model for the surface of interest).

An exemplary algorithm for obtaining color information from a surface is presented herein. The algorithm starts with a target including at least an illumination target element (e.g., a partial sphere) and a set of color target elements. The geometry of the target is known including, e.g., the location of the color target elements, the location of the illumination target element and any location markers. The color(s) of the color target element(s) are also known (e.g., via a pre-measured BRDF of the target) as are the reflection properties of the illumination target element. In general, the target my include location marker information that can be determined via image recognition (for example, circular markers or "+" markers such as depicted in exemplary embodiments herein). In some embodiments, the location markers may need to be out of plane (such as to account for unknown camera optics). A model of the BRDF of a surface to be measured may also be known in advance (e.g., a general model for the type of surface being measured). The BRDF model may include one or more parameters for fitting the generalized model to the specific measured surface. The algorithm may also rely on one or more assumptions, such as (1) that the surface to be measured is not significantly glossier than the illumination target element (note that if the surface is glossy, then the surface area photographed should preferably not be too small), and (2) the surface to be measured is flat.

In some embodiments, it may also be useful for the algorithm to account for properties of the camera being used, e.g., spectral sensitivities of the camera, gamma response of the camera, optical distortion of the camera (e.g., 2D interpolation or the like commonly found in image processing libraries, such as may be determined by photographing an optical distortion target and creating a transform from the camera image to the undistorted image), and spatial uniformity of camera (including directional sensitivity of pixel sensor). Moreover, the algorithm may also account for properties of the surface to be measured. For example, a range of spectral reflectances that are possible or a range of BRDF parameters possible may be known.

The algorithm generally starts by obtaining an image of the target with a sample and transforming the image to an undistorted image (e.g., by applying image distortion correction and/or spatial uniformity correction, if available). Next, the color target elements are generally processed to establish colors in camera color space. This can be achieved, e.g., by using averaging, median, etc. to reduce noise. It is noted that clipping at highlight and shadow can shift the value.

Next, the algorithm may determine a location of the target, e.g., so that a position of target in 3D space can be determined. One method for achieving this is to use a Hough transform. In some embodiments, the algorithm may locate circles on the target or "+" signs on the target such as depicted herein. The algorithm may then create a transform from object coordinates to screen coordinates for the target. A simple way to create this transform would be to have seven or more locations on the target that are at different positions (e.g., different horizontal and/or vertical positions). A simple linear solution will find the parameters for the solution. If fewer locations are used on the target, a non-linear fitting algorithm can be used to find the parameters of the transform. It may be beneficial to have at least one location out-of-plane, e.g., if the focal length of the camera is not known accurately enough. If the focal length of the camera is accurately known, it may be possible to utilize just in-plane locations.

The algorithm may then proceed to create a partial global illumination map. This may be achieved by assuming that lights are far enough away from target so that illumination at the illumination target element is the same as illumination at the sample surface. Thus, creating the partial global illumination map may be basically an inverse of lighting used in 3D graphics. The following describes how to implement the foregoing step with shader code:

(1) Set up 3D object with the geometry of the illumination target element.
(2) Set up 3D object with geometry for global illumination map (probably a simple plane).
(3) Set up 3D transform equations.
(4) Create 2D texture with corrected image from camera.
(5) For each point on the global illumination map, calculate the location on the illumination target element that reflects back to the camera and calculate the screen coordinates of the reflection. Given location in environment map of light and the location of the camera in 3D coordinates, calculate the location on the illumination target element where the light would be viewed from the camera (e.g., for a spherical illumination target element take the vectors that start from the center of the sphere that point to the light and the camera and find the vector that is between them, wherein the vector's intersection with the sphere is the point to look for). In some embodiments, this step may include transforming from world coordinates to image coordinates.
(6) Sample the image texture at the screen coordinates and write the value into the global illumination map.
(7) Only part of the map will map into real screen coordinates. Those points that don't map into real coordinates are left blank. For parts of the map that are blank, the algorithm may utilize a median value, average value, extrapolated value or the like.
(8) Compute view vector from target to camera. See, e.g., view transform provided above.
(9) Compute color transform from camera color space to some device independent space, such as XYZ. For example, the algorithm may rely on established technology, such as camera profiling as found in ColorChecker Passport or the like. In some embodiments, computing the color transform may account for spectral information of both camera and target surface to optimize the transform. The algorithm may incorporate a BRDF of the color target elements to more accurately estimate the actual color as viewed by the camera (for example, by first computing a transform from camera space to device independent space using 0/45 color of the target, next transforming the illumination map to device independent space, and finally using the illumination information and color target element BRDF to compute actual color; note that these steps can be iterative).
(10) Transform the partial global illumination map to a device independent space using camera transform (e.g., using standard color transform technology such as ICC based CMM).
(11) Transform surface color to device independent space using a camera transform (e.g., using standard color transform technology, such as ICC based CMM).
(12) Fit the parameters of the BRDF model of the surface to the device independent surface color and the partial illumination map. This may include setting up an error equation to be used for error minimization. For example, an error equation could be selected to evaluate the BRDF using the partial illumination map and a set of parameters and compares the result to the surface color. Non-linear error minimization could then be used to find a set of parameters that allow the BRDF to match the input.
(13) The BRDF model may be used to compute the color of the surface for desired measurement geometry.

It is explicitly contemplated that the systems and methods presented herein may include/utilize one or more programmable processing units having associated therewith executable instructions held on one or more computer readable medium, RAM, ROM, hard drive, and/or hardware. In exemplary embodiments, the hardware, firmware and/or executable code may be provided, e.g., as upgrade module(s) for use in conjunction with existing infrastructure (e.g., existing devices/processing units). Hardware may, e.g., include components and/or logic circuitry for executing the embodiments taught herein as a computing process.

Displays and/or other feedback means may also be included to convey processed data. The display and/or other feedback means may be stand-alone or may be included as one or more components/modules of the processing unit(s).

In exemplary embodiments, the display and/or other feedback means may be used to facilitate a user interacting with a displayed virtual material via a tactile interface. In some embodiments the display and/or other feedback means includes a touchscreen, which functions as both a display and a tactile interface. The tactile interface may have multi-touch capabilities.

The actual software code or control hardware which may be used to implement some of the present embodiments is not intended to limit the scope of such embodiments. For example, certain aspects of the embodiments described herein may be implemented in code using any suitable programming language type such as, e.g., assembly code, C, C# or C++ using, e.g., conventional or object-oriented programming techniques. Such code is stored or held on any type of suitable non-transitory computer-readable medium or media such as, e.g., a magnetic or optical storage medium.

As used herein, a "processor," "processing unit," "computer" or "computer system" may be, e.g., a wireless or wire line variety of a microcomputer, minicomputer, server, mainframe, laptop, personal data assistant (PDA), wireless e-mail device (e.g., "BlackBerry," "Android" or "Apple," trade-designated devices), cellular phone, pager, processor, fax machine, scanner, or any other programmable device. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 14:
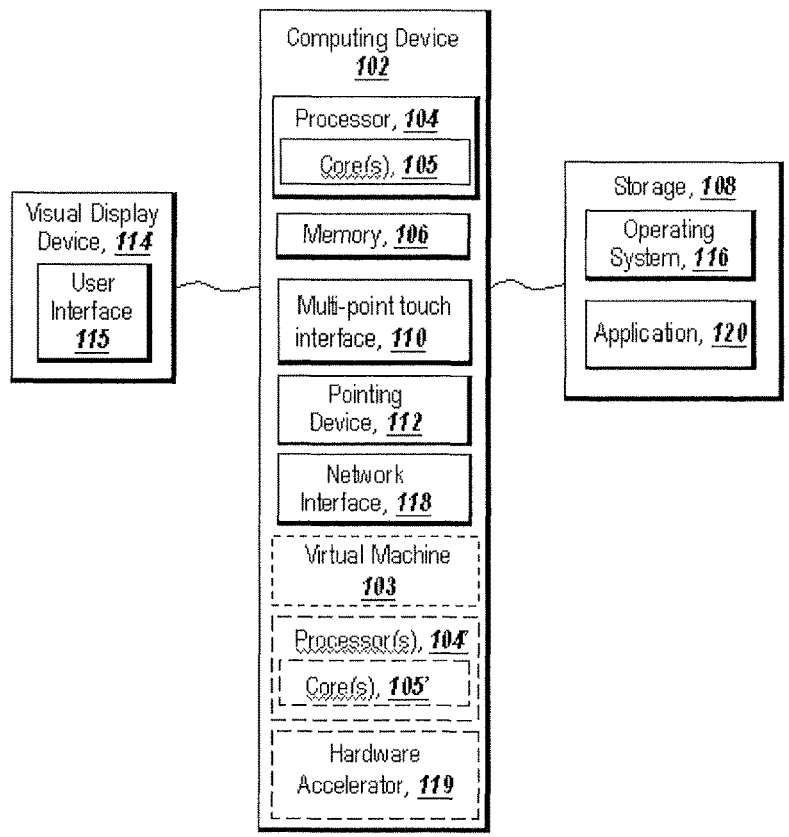
FIG. 14 depicts an exemplary computing environment suitable for practicing exemplary embodiments disclosed herein.

Referring now to FIG. 14, an exemplary computing environment suitable for practicing exemplary embodiments is depicted. The environment may include a computing device 102 which includes one or more media for storing one or more computer-executable instructions or code for implementing exemplary embodiments. For example, memory 106 included in the computing device 102 may store computer-executable instructions or software, e.g. processing application 120.

The computing device 102 also includes processor 104, and, one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 119, such as implemented in an ASIC, FPGA, or the like, can additionally be used to speed up the general processing rate of the computing device 102.

The memory 106 may comprise a computer system memory or random access memory, such as DRAM, SRAM, EDO RAM, or the like. The memory 106 may comprise other types of memory as well, or combinations thereof. A user may interact with the computing device 102 through a visual display device 114, such as a display of a mobile device, which may display one or more user interfaces 115. The visual display device 114 may also display other aspects or elements of exemplary embodiments, e.g., adjusted measurement values for a particle characteristic. The computing device 102 may include other I/O devices such as a multiple-point touch interface 110 and a pointing device 112 for receiving input from a user. The multiple-point touch interface 110 and the pointing device 112 may be operatively associated with or integral with the visual display device 114. The computing device 102 may include other suitable I/O peripherals. The computing device 102 may further comprise a storage device 108, such as a hard-drive, CD-ROM, or other storage medium for storing an operating system 116 and other programs, e.g., a program 120 including computer executable instructions for modeling deformation characteristics of a material and for generating a virtual representation of a physical interaction with the material.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Although the teachings herein have been described with reference to exemplary embodiments and implementations thereof, the disclosed apparatus, systems and methods are not limited to such exemplary embodiments/implementations. Rather, as will be readily apparent to persons skilled in the art from the description taught herein, the disclosed apparatus, systems and methods are susceptible to modifications, alterations and enhancements without departing from the spirit or scope hereof. Accordingly, all such modifications, alterations and enhancements within the scope hereof are encompassed herein.

What is claimed:

1. A system comprising:
a target apparatus comprising at least one illumination target element having a plurality of different known surface normals, and a set of color target elements having known colors;
an imaging device; and
a processor, the processor being configured to (a) extract at least a partial environment map of global illumination, of a scene including the target apparatus, from a single image of the scene that is imaged by the imaging device; (b) capture respective colors for the set of color target elements from the image of the scene; (c) determine expected colors for the set of color target elements based at least on the known colors of the set of color target elements and the extracted partial environment map; and (d) calculate color transformation parameters based on differences between the expected colors and the captured colors for the set of color target elements.

2. The system of claim 1, wherein the partial environment map stores information that provides illumination conditions for the imaged scene including, for each light source included in the partial environment map, (i) spatial characteristics of the light source relative to the target apparatus, (ii) intensity characteristics of the light source, and (iii) color characteristics of the light source.

3. The system of claim 1, wherein the at least one illumination target element includes at least one illumination target element characterized by a non-planar surface.

4. The system of claim 1, wherein the at least one illumination target element comprises at least one illumination target element having a non-planar surface that is a sphere or a partial sphere.

5. The system of claim 1, wherein the at least one illumination target element includes a plurality of illumination target elements, each of which is characterized by a different surface normal or a different surface normal map than the others.

6. The system of claim 5, wherein each of the plurality of illumination target elements includes a planar surface characterized by a different surface normal than the others.

7. The system of claim 1, wherein the at least one illumination target element comprises at least one illumination target element that is glossy.

8. The system of claim 1, wherein the at least one illumination target element comprises at least one illumination target element that is colored black.

9. The system of claim 1, wherein the at least one illumination target element comprises at least one illumination target element that is semi-glossy.

10. The system of claim 1, wherein the at least one illumination target element comprises at least one illumination target element that is characterized by predetermined reflectance characteristics which are similar to reflectance characteristics for a sample surface of interest.

11. The system of claim 1, wherein the at least one illumination target element comprises at least one illumination target element that is characterized by a predetermined gloss level which is similar to the gloss level for a sample surface of interest.

12. The system of claim 1, wherein the processor determination of the expected colors also is based on viewing conditions and reflectance characteristics for the set of color target elements during imaging of the target apparatus by the imaging device.

13. The system of claim 1, wherein the target apparatus further comprises alignment features for enabling determination of spatial characteristics of the target apparatus in an image thereof.

14. The system of claim 1, wherein the target apparatus further comprises a sample window for aligning a sample surface with the target apparatus.

15. The system of claim 1, wherein the target apparatus further comprises a distortion target element.

16. The system of claim 1, the processor being further configured to (i) determine, for each image in a plurality of images of a scene including the target apparatus and a sample surface acquired by the imaging device across a plurality of different illumination or viewing conditions, illumination conditions and viewing conditions based on a processing of the image, and (ii) estimate a reflectance model for the sample surface based on changes in reflectance of the sample surface as reflected in acquired images of the scene across the plurality of different illumination or viewing conditions.

17. The system of claim 1, further comprising:
a non-transitory storage medium;
wherein known reflectance characteristics and the known colors of the set of color target elements are stored in the non-transitory storage medium; and
wherein the known reflectance characteristics of the set of color target elements are used by the processor in determining the expected colors for the set of color target elements.

18. A method for determining color transformation parameters, the method comprising:
placing a target apparatus in a scene to be imaged, the target apparatus comprising a set of color target elements having known colors and at least one illumination target element having a plurality of different known surface normals;
imaging the scene;
processing a single image of the scene to extract an at least partial environment map of global illumination of the scene;
capturing respective colors for the set of target elements from the image of the scene;
determining expected colors for the set of color target elements based at least on the known colors of the set of color target elements and the extracted at least partial environment map; and
calculating color transformation parameters based on differences between the expected colors and the captured colors for the set of color target elements.

19. The method of claim 18, further comprising:
placing a sample surface in the scene to be imaged; and
utilizing the calculated color transformation parameters to transform colors of the imaged sample surface.

20. The method of claim 18,
wherein the imaging step comprises imaging the scene across a plurality of different illumination or viewing conditions;
wherein the processing step comprises processing each image of the scene to extract a partial environment map for each of the different illumination or viewing conditions; and
wherein the method further comprises:
placing a sample surface in the scene to be imaged; and
estimating a reflectance model for the sample surface based at least on information from the different partial environment maps for the different illumination or viewing conditions.

21. The method of claim 18, wherein the processing step comprises use of the known surface normals and of the imaged at least one illumination target element to extract the at least partial environment map.

22. The method of claim 18, wherein the determining step comprises using the at least partial environment map to account for spatial characteristics relative to the target apparatus, intensity characteristics, and color characteristics of each light source included in the at least partial environment map.

23. The method of claim 18, wherein reflectance characteristics of the set of color target elements are known and are used in the determining step.

24. The method of claim 18, further comprising placing a sample surface with a known reflectance model in the scene to be imaged.

* * * * *